United States Patent [19]

Pappas et al.

[11] 4,287,220

[45] Sep. 1, 1981

[54] HULL CONTAINING COMPOSITIONS

[75] Inventors: Clifford J. Pappas, Richardson, Tex.; Albert F. Vickers, Glenville, N.Y.

[73] Assignee: Frito-Lay, Inc., Dallas, Tex.

[21] Appl. No.: 122,803

[22] Filed: Feb. 19, 1980

[51] Int. Cl.$^3$ .............................................. A23K 1/14
[52] U.S. Cl. .................................... 426/623; 426/630; 426/637; 426/807
[58] Field of Search ............... 426/634, 615, 637, 623, 426/630, 635, 618, 632

[56] References Cited

U.S. PATENT DOCUMENTS 2,905,557  9/1959  Degenhardt ......................... 426/623
4,181,748  1/1980  Chwalek et al. ..................... 426/635

Primary Examiner—Joseph M. Golian
Assistant Examiner—Elizabeth J. Curtin
Attorney, Agent, or Firm—Bernard, Rothwell & Brown

[57] ABSTRACT

Essentially solid, free-flowing, blended compositions are provided containing wastes or by-products obtained in manufacturing cooked, farinaceous food products, especially snack chips, e.g., corn chips or potato chips, and one or more of rice hulls, soybean hulls and peanut hulls. The compositions may, in addition, contain other dietary solids, such as other cellulosic fibrous wastes. The compositions are useful as animal feeds or as animal feed ingredients.

17 Claims, No Drawings

HULL CONTAINING COMPOSITIONS

The present invention relates to essentially solid, free-flowing, blended compositions that are composed of substantial amounts of the wastes or by-products obtained in manufacturing cooked, farinaceous food products, especially snack chips, e.g., corn chips or potato chips, and one or more of rice hulls, soybean hulls or peanut hulls. The compositions may, in addition, contain other dietary solids, such as other cellulosic fibrous waste materials. The compositions are useful as animal feeds or animal feed ingredients.

In the manufacture of snack chips there are obtained a variety of solids-containing materials that are conventionally disposed of as waste, land fill or as a wet feed for animals. Not only is the disposal an economic loss in terms of the yield of chips based on the total potatoes or grain utilized as feed to the overall operation, but such disposal may cause considerable concern regarding pollution, handling problems or added loads on sewage treating plants. As these problems become more acute, there is increased pressure to alleviate the waste problems in ways that are not only environmentally acceptable, but in doing so while upgrading the quality of the by-products to reduce economic loss, and, hopefully, even to the point of monetary profit from the operation. The present invention is an improvement in these respects.

When manufacturing potato products such as potato chips, there is generally obtained one or more effluent aqueous streams that are derived from washing or other handling or treating operations. Thus, the raw, whole potatoes may be washed, and depending on the nature of the operation and factors such as the extent of abrasion occurring during processing and transporting, the wash water may contain a modicum of potato solids. Also, if the potatoes are peeled, they may be washed to remove surface starch, and where potato slices are made, they may be water-washed whether or not the potatoes are peeled. When the potatoes are peeled, the peels are another by-product whose disposal is needed. Whenever the wash water contacts portions of the potatoes that are not covered with peel, the water carries away starch and sometimes other potato parts or ingredients in either dissolved or solid particle form. The potatoes in whole, sliced or other condition may undergo other treatments such as blanching that produce waste streams containing potato solids. Grains destined for making farinaceous foods such as snack chips, may also undergo washing or other treatment involving the production of an aqueous stream containing grain solids and water. The solids from these various operations may be referred to generally as waste water solids.

Also, when making potato products, potato culls must usually be separated from the process and thus not converted into cooked product, e.g., fried snack chips. The culls which may be whole, raw potatoes or parts thereof, either peeled or unpeeled, also present a disposal problem and are a yield loss in terms of the cooked product obtained. The same is true with respect to the potato slivers that may be formed during slicing, or other potato pieces resulting from, for instance, cutting or abrasion, which are not suited for conversion into good quality food products. These culls and slivers are thus additional by-products of the food manufacturing process.

In the manufacture of cooked foods, for instance, snack chips, derived from grains such as corn, wheat, and the like, the grain is usually dehulled which involves treatment in an aqueous medium that may contain chemicals such as calcium hydroxide. The resulting aqueous steeping liquor by-products containing hulls and other grain solids, such as whole grains, germ and starch, also present disposal problems, as well as losses in grain solids in the cooked products. These solids may be separated from the bulk of the aqueous phase by the use of centrifuges, belt presses, or other dewatering equipment.

Another source of waste or by-products in the food manufacturing operations is "sweepings." During processing a modicum of the potato or grain solids inevitably find their way to the floor or on outside of equipment surfaces. These solids may be whole or parts of the potato or grain, or dough, chips or other forms thereof. The solids are termed sweepings which indicates their source, i.e., obtained by sweeping the floor of the plant or brushing or otherwise cleaning the equipment. Of course, these solids may be collected by vacuum or other systems. The sweepings, as well as other losses of solids from a given process are a disposal problem and result in economic loss as discussed above.

A further amount of solids may also result from various facilities for treating wastes from these chip manufacturing plants by, for instance, biodegradation. The disposal of these by-product solids may be a problem, and they may be generally referred to as bio-solids by-products or waste water biological solids.

In operating food manufacturing plants it is frequently the case that two or more of the various waste materials are combined and, perhaps, treated to obtain materials having the viscosity of, for instance, tooth paste or pancake batter for disposal. Some or all of the streams may have handling problems and subject, for instance, to agglomeration or freezing, or exhibit other undesirable physical characteristics that present serious difficulties when various bulk storage or handling systems are employed. When the streams are mixed, the combination of ingredients may even be more unmanageable than each stream was separately. Also, as noted, many of these by-product components are aqueous and have substantial and even major amounts of unabsorbed water. The presence of this free water can present handling problems or limit the type of equipment that is suitable for transporting the waste materials. Where there are undesirably large amounts of unabsorbed water present, such water could be reduced in amount by evaporation, but this would be costly and a relatively large and undue expenditure of energy.

The disposal of these various by-product streams is an economic problem and the undue loss of solids from the food manufacturing operation represents an economic burden which could be countered at least to some extent by incorporating the by-products in compositions that are more readily marketable, and doing so relatively easily without undue, or indeed any, overall increased expenditure, after the value of the product compositions is taken into account. It is advantageous if the food by-products be produced or obtained as essentially solid, relatively free-flowing materials that readily pass by gravity from equipment such as storage bins and that can be easily handled by various types of equipment such as conveyors, pneumatic tubes, and bucket elevators, without giving rise to bridging, plugging or other undue flow-inhibiting or equipment-damaging effects.

This is particularly the case with respect to the more or less final composition that may be stored for at least a short period of time and goes into various systems of commerce for distributing and use. The compositions should also be essentially non-dusting. It is, of course, highly desirable that the by-products be in forms of increased economic worth and marketability to off-set all or a portion of the costs involved in the disposal operation.

The present invention is a substantial solution to the foregoing problems concerned with product characteristics such as flowability, freezing temperature, non-dusting, and increase in food quality or by-product value. The extent to which the invention is successful towards making the disposal operation less of an economic loss or even profitable, may depend on the factors of a particular situation, including marketing conditions and even geographical location. The invention provides essentially solid, free-flowing, blended compositions of good protein content and relatively high net energy value containing substantial amounts, e.g., at least about 20 to 25 weight percent, of the waste or by-products from manufacturing cooked, farinaceous food products as described herein, and a total of at least about 40 weight percent of one or more of rice hulls, soybean hulls and peanut hulls. Preferably, the hulls component may be composed of at least about 40% soybean hulls. By the designation free-flowing, is meant that the compositions readily flow by gravity from a storage bin having a bottom outlet cone whose sides form an apex of about 60 degrees leading to an outlet of about 400 square inches in cross-sectional area. As the ratio of by-products to hulls increases, bridging and flowability problems in storage bins may become significant, but this problem can be avoided by appropriate design of the bins, e.g., provide larger openings and/or openings that are rectangular. The compositions of the invention generally have good storage stability over substantial periods, e.g., in excess of about four weeks. The compositions contain little, if any, unabsorbed water existing as a separate phase.

The compositions of the invention often contain about 20 to 60 weight percent of the waste products from cooked, farinaceous food manufacturing operations, and about 40 to 80 weight percent of the designated hulls, based on the total weight of these components. Preferably, these amounts are less than about 45% and greater than about 55%, respectively. The undissolved solids in the compositions are in relatively small particle or divided form, e.g., essentially all passing an approximately ¼ inch mesh screen or even a screen of about ⅛ inch mesh size. These particles can be made into larger form after being blended, and pelleting is usually suitable in this respect. If the solid particles in the blended compositions are too large in size, flowability problems may be encountered. Any reduction in the size of the particles can be accomplished before or after the ingredients of the compositions are combined and the timing of any comminution may depend on factors such as the handling characteristics of the separate and mixed materials, equipment availability, and the like. Comminution can be done in a hammer mill or similar equipment. The total moisture content of the combined compositions of the invention which, as noted above, is mostly, if not essentially entirely, absorbed water, is often about 20 to 45 or 50 weight percent, preferably about 25 to 35 weight %. Total moisture content is defined herein as the water that can be evaporated from the compositions by heating at 102°±2° C. for 4 hours or until constant weight is obtained.

The overall by-products obtained from the manufacture of cooked farinaceous foods, e.g., baked or fried, especially fried, and included as part of the compositions of the present invention may generally have a substantial or major amount of total moisture say about 50 to 80, preferably about 60 to 75, weight percent of total moisture. The undissolved solids content of the overall by-product materials employed may thus be about 20 to 50 weight percent, preferably about 25 to 40 weight percent. These percentages of total moisture and undissolved solids are based on the total weight of these overall by-products from the operations for manufacturing farinaceous, cooked foods. The undissolved solids are often at least about 10 weight percent to a major extent derived from one or more of the potato or corn sources. The undissolved solids may especially contain about 30 to 70 weight percent from potato sources and about 30 to 70 weight percent from corn processing. Preferably, these amounts are about 45 to 55 weight % and 45 to 55 weight %, respectively. The undissolved, waste by-product solids in given compositions of the invention may typically be derived from the following sources in approximate weight percent based on their total (dry basis):

|  | General | Usual |
| --- | --- | --- |
| Centrifuged grain solids | 10 to 30 | 15 to 25 |
| Waste water solids | 35 to 65 | 45 to 60 |
| Culls and/or slivers | 1 to 10 | 3 to 8 |
| Grain and potato sweepings | 10 to 35 | 15 to 30 |

Any one or more of the listed components may be essentially absent or be present in a lesser or greater amount than the stated ranges. Thus, the amount of any of these components may be from zero to the stated maximum or more. Thus, it can be seen that the compositions are subject to considerable variation as to the source and composition of the wastes or by-products.

The solids-containing materials separated from waste water streams produced in making potato or grain products generally have on as "as is" basis about 20 to 60 weight % undissolved solids, often about 30 to 50 weight %. Thus these separated solids often contain about 40 to 80 weight % total moisture, preferably about 50 to 70%. One or more of the potato peelings, potato screenings and corn screenings components may be included in this by-product. The wash waters here referred to do not include the solids-containing aqueous mixtures obtained by centrifuging, or otherwise treating, grain steeping liquors. The wash waters may thus be treated for starch or other solids separation or concentration, and the separated solids represent by-products that may be used in this invention, although if the starch is sufficiently pure it may be sold or used as such.

Sweepings often have little, if any, unabsorbed water, although some may be present on the wet surfaces of the solids. If the sweepings are composed primarily of cooked product wastes, they may contain only a minor amount of total moisture, e.g., less than about 10 or 15 weight %, and, perhaps, up to about 5%, and say at least about 1%. Uncooked potato or grains or pieces thereof such as centrifuged solids, culls, slivers and peels, may contain a major amount of total moisture, e.g., at least about 70 or 80%, and up to about 90% or somewhat more. Thus, the steeping liquors and other aqueous waste streams from potato- or grain-treating operations, such as blanching and dehulling, may have about 75 to 95 weight % unabsorbed water, preferably about 80 to 90%. Rice, soybean or peanut hulls may also have little, if any, unabsorbed water, say up to about 10 or 15 weight % or so.

The water content of any of the foregoing materials may be adjusted as by, for instance, separate water addition, but this may not be particularly advantageous since it can give rise to compositions of undue non-absorbed water content. The components of the compositions can be blended or mixed by various types of suitable equipment such as screw conveyors, ribbon mixers, paddle mixers, roller mills and the like, especially non-energy intensive equipment of relatively low cost. The compositions can contain minor amounts of other ingredients such as viscosity or flowability stabilizers, wheat straw or other dietary, cellulosic fibrous material, preservatives and the like. Also, the compositions can be pelleted or otherwise made into shaped particles, if desired.

The present invention is particularly concerned with upgrading the various wastes or by-products of the types noted above and obtained in the manufacture of farinaceous snack chips. These products are best known in the forms of potato and corn chips, although other grains, e.g., wheat, rice, or the like, or both grain, and potato solids may be present in individual chips. Snack chips are generally made by deep fat frying in vegetable oil of relatively thin potato slices or other chip precursor pieces of potato and/or grain-derived doughs. The potato slices or dough pieces often have a thickness of about 0.03 to 0.1 inch although the thickness, especially when the pieces are in dough form, may be up to about 0.2 inch or somewhat more. The other dimensions of the chips are usually at least about 0.5 inch, say up to about 3 or 4 or more inches, especially in the case of tortilla chips.

As noted, the snack chip by-product compositions of the present invention containing one or more of soybean, rice or peanut hulls are useful as animal feeds or feed ingredients. In the latter case, the by-product-hull blends may constitute a substantial amount of the blended feed, for example, the amount of the by-product-hull component may be from about 5 to 95% of the mixed feed compositions, although feeds containing about 5 to 10% to 50% of the by-product-hull ingredient may be advantageous. It seems most preferred to have about 10 to 30% of the by-product-hull blend in the mixed feeds.

The feeds can be suitable for a variety of domestic animals or mammals such as swine, cattle, sheep, poultry and the like. Aside from the snack by-product-hull blend, the mixed feeds may contain various ingredients to provide a balanced diet, e.g., vitamins, proteins, minerals and carbohydrates which may be embodied in grain in whole or ground form, mineral flours, fish flours, seeds, seed meals, molasses, vegetable oils, fats, meat scraps, vitamin supplements, and the like. The feeds may be dry or substantially liquid and thus may contain suitable amounts of water.

The present invention will be further illustrated by the following examples. The amounts of materials referred to in the examples are on a weight basis unless indicated otherwise.

EXAMPLE 1

An initial mixture was made from the by-products of corn chips and potato chip manufacturing operations. This mixture (Mix A) was made by combining 46.3 parts (15% dry solids) of the solid-containing cake obtained by centrifuging corn steeping liquors; 42.7 parts (40% dry solids) of a mixture of solids separated as sludge by vacuum filtration of the combined aqueous streams obtained by water-washing peeled potatoes and potato slices and potato peelings in a potato chip manufacturing plant and the corn screenings from a corn chip manufacturing plant; and 11 parts (15% dry solids) of ground potatoes and potato pieces obtained as culls and slivers from slicing operations and abrasion during processing. The Brookfield viscosity of the culls and slivers when ground through a ⅛ inch screen was 1500 centipoises but the viscosity was unstable. None of the ingredients in Mix A had more than minimal blendability. Mix A had a dry solids content of 25%. Mix A was not readily blendable or flowable. The floor sweepings of the potato and corn chips manufacturing operations were ground through a roller mill to pass a 1/16 screen. Mix A was combined in an amount of 92.3 parts with 7.7 parts of the floor sweepings to obtain Mix B having 31% dry solids. Mix B was transportable by use of an open cavity Moyno pump, and was subject to bridging when feeding to the pump.

Mix B was combined in an equal amount with soybean hulls to produce Blend 1A having a moisture content of 36 to 40%. Blend 1B was similar to Blend 1A except that in Blend 1B the amount of soybean hulls was twice the amount in Blend 1A. Another blend, i.e., Blend 1C having an absorbed water content of about 28 to 30%, was made by combining equal amounts of each of Mix B, rice hulls and soybean hulls. All of Blends 1A, 1B and 1C represent products of the present invention and were readily flowable at ambient temperature. Also, 0.5% of propionic acid was added to portions of each of Blends 1A and 1C. Portions of Blend 1B were combined with small amounts of propionic acid (0.5 to 3%), with or without 1% of phosphoric acid as preservatives.

The freezing properties of blends were determined at temperatures from 0° to −25° C. and the results for Mix B and blends 1A, 1B and 1C are reported in Table I.

TABLE I

| Mix or Blend | Visual Observation | | | | | |
|---|---|---|---|---|---|---|
| | 0° | −5° C. | −10° C. | −15° C. | −20° C. | −25° C. |
| B | *Froze | — | — | — | — | — |
| 1A | Flowable | Crystals formed | Agglomeration | Solid agglomerate | — | Solid agglomerate |
| 1B | Flowable | No crystals, Flowable | Small crystals formed, Flowable | Small crystals formed, Flowable | Small crystals formed, Flowable | Small crystals formed, Flowable |
| 1C | Flowable | No | No | No | No | No |

TABLE I-continued

| Mix or Blend | 0° | −5° C. | −10° C. | Visual Observation<br>−15° C. | −20° C. | −25° C. |
|---|---|---|---|---|---|---|
| | | crystals,<br>Flowable | crystals,<br>Flowable | crystals,<br>Flowable | crystals,<br>Flowable | crystals,<br>Flowable |

*Froze within one hour regardless of the presence of propionic acid, with or without $H_3PO_4$.

EXAMPLE 2

A study was made of the flow and storage properties of several blends corresponding to Blends 1A, 1B and 1C and to other blends, i.e., Blend 1BP in which the soybean hulls of Blend 1B were replaced by an equal amount of peanut hulls, Blend 1CP in which the rice hulls of Blend 1C were replaced by an equal amount of peanut hulls, and Blend 1CPR in which the soybean hulls of Blend 1C were replaced by an equal amount of peanut hulls. All blends were ground through a screen having ⅛ inch openings, except those containing peanut hulls which were ground through a screen having ¼ inch openings due to plugging difficulties of the smaller ⅛ inch screen size. All of the blends flowed readily through screw conveyors, pneumatic systems, bucket elevators and belt conveyors without plugging or bridging under normal loads. None of the blends, except Blend 1A, bridged in conventional storage bins and hopper scales. Blends 1B and 1C may pose problems in flowability or bridging in conventional bins. When Blend 1A was made with rice hulls or peanut hulls, instead of soybean hulls, the product was more difficult to handle and would cause flow problems in conventional feedmill equipment. The blends containing soybean hulls were most suitable with respect to water absorption and flowability, and larger quantities of potato and corn chip by-products can be added to soybean hulls while retaining ease of handling compared to similar blends containing rice or peanut hulls. The latter two types of hulls are best used in blends having a ratio approximately 2:1 or more of hulls to by-products, and considerable problems may be encountered when this ratio is 1:1.

Animal feed studies were made with Blends 1A and 1C. Blend 1A being fed to poultry and swine at various levels in the diet. When incorporating from about 10 to less than 20% of Blend 1A in poultry feed there was little difference in weight gain compared to the same diet in which none of Blend 1A was included. At a 20% or more level of Blend 1A, the feed conversion efficiency was lowered significantly. However, even at these higher levels the total weight gain over an 8-week test period was significantly greater than the 1977 NRC standard. Typically, the ingredients in the feed, other than Blend 1A, included yellow corn, soybean meal, meat and bone meal, fish meal, distillers dried solubles, fat, and a premix of various feed supplements such as vitamins, metals, phosphorus, salt, riboflavin, niacin, and a variety of other ingredients.

In the case of feeding Blend 1A to swine, diets having up to about 20% of the blend gave about the same feed conversion efficiency as the diet without Blend 1A. When the amount of Blend 1A was increased to 40% of the diet, feed conversion efficiency decreased.

Blend 1C was fed to cattle to replace corn silage or prairie hay in the diet. It was found that Blend 1C was substantially the same as these other materials as a source of fiber.

EXAMPLE 3

In order to illustrate the present invention on a large scale, the blended compositions were made and bagged utilizing standard dry feed mill equipment. Three trials were made, and two employed a partially loaded ribbon blender, while in the third run the blender was fully loaded during blending. The materials blended were as follows: Soybean hulls (as mill feed), 8.8% moisture Rice hulls, 8.7% moisture Snack food by-products, 72.2% moisture by analysis

| | Wt. % | Moisture, % |
|---|---|---|
| Floor sweepings from corn<br>and potato chip<br>operations | 7.7 | 3 |
| Potato slivers and<br>culls | 10.2 | 86 |
| Potato and corn sludge[1] | 39.4 | 60 |
| Corn centrifuge solids | 42.7 | 86 |
| | 100.0 | 69.4 |

[1]Contains potato starch, potato clarifier sludge and potato and corn screenings (vacuum filter cake), i.e., wash water solids component.

In Run 1, 1,000 pounds of each of the soybean mill feed and rice hulls were mixed in the blender and the by-product material, 1,020 pounds, was added as the blender operated. The total composite was blended for about 15 minutes. The blended material (29.3% moisture) had no lumps and was conveyed pneumatically to a surge hopper, automatically weighed and bagged in this and Runs 2 and 3. In Run 1 bridging occurred in the hopper which was above the weighing scale when the operation was disrupted. This bridging may have been due to the outlet from the hopper being small, and may not have occurred if the hopper had a larger size opening of say, 400 square inches.

In Run 2, 300 pounds of each of rice hulls and soybean mill feed were initially mixed. 299 pounds of the by-product mixture was added with the blender not operating. The blender was started without any problem occurring, and the blend time was 2 minutes. The blend (32.6% moisture) was uniform and without lumps. As long as the flow of blended product through the hopper and into the bags was maintained, no bridging occurred.

Run 3 was a full capacity blending operation. 2,111 pounds of the combined by-products, 2,029 pounds of rice hulls and 2,029 pounds of soybean mill feed were used. The rice and soybean material were mixed initially, and the by-product material was added in a mass while the blender was not operating. Due to the mass of by-products in one area of the blender, it would not start. About 500 pounds of the mixed rice hulls and soybean mill feed were removed from the blender which was then started. Blending continued for two minutes and the materials blended well with no lumping. The blended composition was bagged without encountering flow problems when there were no delays in the operation.

It is claimed:

1. An essentially solid, blended, flowable composition comprising (a) about 40 to 80% of one or more materials selected from the group consisting of soybean hulls, rice hulls and peanut hulls and (b) about 20 to 60% of waste products from the manufacture of cooked farinaceous food products, or mixtures of such waste products, said percentages of (a) and (b) being based on the total of their weight, said waste products having on a total basis about 20 to 50 percent of undissolved solids derived from said manufacture and about 50 to 80 percent total moisture content based on the total weight of said solids and water, and the total moisture content of said blended composition being about 20 to 50%.

2. A composition of claim 1 in which said undissolved solids comprise one or more of corn and potato solids.

3. A composition of claim 2 in which said undissolved solids comprise at least about 10% of each of corn and potato solids.

4. A composition of claim 3 in which said undissolved solids comprise corn solids of corn steeping liquor and comminuted potato pieces.

5. A composition of claim 4 in which said hulls comprise soybean hulls.

6. A composition of claim 5 in which said waste products include solids separated from wash water obtained by washing peeled whole potatoes or potato pieces.

7. A composition of claim 1, 2, 3, 4, 5 or 6 in which said hulls comprise at least about 40% soybean hulls.

8. An essentially solid, flowable, blended composition comprising (a) about 40 to 80% of one or more materials selected from the group consisting of soybean hulls, rice hulls and peanut hulls, and (b) about 20 to 60% of waste products from the manufacture of fried potato or grain-derived chips, said waste products containing about 50 to 80% total moisture content and including undissolved solids selected from the group consisting of corn solids of grain steeping liquor, comminuted or slivered potatoes, and sweepings from the manufacture of fried potato or grain-derived chips, the total moisture content of said blended composition being about 20 to 50%.

9. A composition of claim 8 in which said undissolved solids comprise one or more of corn and potato solids.

10. A composition of claim 9 in which said undissolved solids comprise at least about 10% of each of corn and potato solids.

11. A composition of claim 10 in which said waste products comprise corn solids of corn steeping liquor and comminuted potato pieces.

12. A composition of claim 11 in which said waste products include solids separated from wash water obtained by washing peeled whole potatoes or potato pieces.

13. A composition of claim 12 in which said hulls comprise soybean hulls.

14. A composition of claim 8, 9, 10, 11, 12 or 13 in which said hulls comprise at least about 40% soybean hulls.

15. An animal feed or feed ingredient containing a substantial amount of the blended composition of claim 1, 2, 3, 4, 5, 8, 9, 10, 11, 12 or 13.

16. An animal feed or feed ingredient of claim 15 in which said blended composition is about 10 to 50% of the total composition.

17. An animal feed or feed ingredient of claim 16 in which said hulls comprise at least about 40% soybean hulls.

* * * * *